(12) United States Patent
Horsnell et al.

(10) Patent No.: US 11,422,808 B2
(45) Date of Patent: Aug. 23, 2022

(54) TRANSACTIONAL COMPARE-AND-DISCARD INSTRUCTION

(71) Applicant: Arm Limited, Cambridge (GB)

(72) Inventors: Matthew James Horsnell, Cambridge (GB); Grigorios Magklis, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/258,287

(22) PCT Filed: May 9, 2019

(86) PCT No.: PCT/GB2019/051275
§ 371 (c)(1),
(2) Date: Jan. 6, 2021

(87) PCT Pub. No.: WO2020/012151
PCT Pub. Date: Jan. 16, 2020

(65) Prior Publication Data
US 2021/0141643 A1 May 13, 2021

(30) Foreign Application Priority Data
Jul. 9, 2018 (EP) .................................... 18386021

(51) Int. Cl.
*G06F 9/46* (2006.01)
*G06F 9/30* (2018.01)
(Continued)

(52) U.S. Cl.
CPC ........ *G06F 9/30043* (2013.01); *G06F 9/3842* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 2008/0120298 A1* | 5/2008 | Duffy | ...................... G06F 9/467 |
| 2009/0138890 A1* | 5/2009 | Blake | ...................... G06F 9/466 |
| | | | 718/106 |

(Continued)

OTHER PUBLICATIONS

International Search Report and Written Opinion of the ISA for PCT/GB2019/051275, dated Aug. 2, 2019, 14 pages.

(Continued)

*Primary Examiner* — Hyun Nam
(74) *Attorney, Agent, or Firm* — Nixon & Vanderhye P.C.

(57) ABSTRACT

An apparatus comprising: processing circuitry to process threads of data processing; and transactional memory support circuitry to support execution of a transaction within a thread processed by the processing circuitry. In response to a transactional compare-and-discard instruction executed within a given transaction, specifying a target address and a compare value, the processing circuitry loads a target data value from a memory location corresponding to the target address; sets at least one condition status indication depending on a result of comparing the target data value and the compare value; and discards the target data value without adding the target address to a working set of addresses tracked for the given transaction. This is useful for enabling thread level speculation to be implemented on a transactional memory architecture.

11 Claims, 9 Drawing Sheets

(51) Int. Cl.
*G06F 9/38* (2018.01)
*G06F 13/16* (2006.01)

(56) References Cited

U.S. PATENT DOCUMENTS

| | | | |
|---|---|---|---|
| 2011/0119452 A1* | 5/2011 | Heller, Jr. | G06F 11/0793 |
| | | | 711/147 |
| 2011/0185360 A1* | 7/2011 | Mitchell | G06F 9/466 |
| | | | 718/101 |
| 2012/0084477 A1* | 4/2012 | Arndt | G06F 9/3859 |
| | | | 710/266 |
| 2013/0019083 A1* | 1/2013 | Cain, III | G06F 9/30087 |
| | | | 712/203 |
| 2014/0115249 A1 | 4/2014 | Jacobi et al. | |
| 2014/0160468 A1* | 6/2014 | Iwanabe | G01M 11/31 |
| | | | 356/73.1 |
| 2015/0248310 A1* | 9/2015 | Dice | G06F 9/544 |
| | | | 719/312 |
| 2015/0278120 A1* | 10/2015 | Shum | G06F 9/3834 |
| | | | 711/163 |
| 2018/0011768 A1* | 1/2018 | Bradbury | G06F 11/1407 |
| 2021/0141643 A1* | 5/2021 | Horsnell | G06F 9/3842 |
| 2021/0357214 A1* | 11/2021 | Mishaeli | G06F 9/485 |

OTHER PUBLICATIONS

Search Report EP18386021, dated Jan. 24, 2019, 9 pages.
Robert Bedichek, "Some Efficient Architecture Simulation Techniques," Proceedings of the Winter 1990 USENIX Conference, Jan. 22-26, 1990, 12 pages.
Juan Salamanca et al., "Using hardware-transactional-memory support to implement thread-level speculation", IEEE Transactions on Parallel and Distributed Systems, vol. 29, No. 2, Feb. 2018, 15 pages.

* cited by examiner

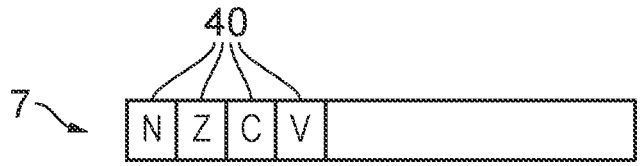

| Suffix | Flags | Meaning |
|---|---|---|
| EQ | z set | Equal |
| NE | z clear | Not equal |
| CS/HS | c set | Higher or same (unsigned >= ) |
| CC/LO | c clear | Lower (unsigned < ) |
| MI | n set | Negative |
| PL | n clear | Positive or zero |
| VS | v set | Overflow |
| VC | v clear | No overflow |
| HI | c set and z clear | Higher (unsigned <= ) |
| LS | c clear or z set | Lower or same (unsigned <= ) |
| GE | N and v the same | Signed >= |
| LT | N and v different | Signed < |
| GT | z clear, and N and v the same | Signed > |
| LE | z set, or N and v different | Signed <= |
| AL | Any | Always (usually omitted) |

FIG. 3

TRANSACTIONAL COMPARE-AND-DISCARD INSTRUCTION

This application is the U.S. national phase of International Application No. PCT/GB2019/051275 filed 9 May 2019 which designated the U.S. and claims priority to EP Patent Application No. 18386021.2 filed 9 Jul. 2018, the entire contents of each of which are hereby incorporated by reference.

The present technique relates to the field of data processing. More particularly, it relates to transactional memory.

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflicts between threads accessing shared resources can be to use transactional memory support. A data processing system may have circuitry to support execution of a transaction within a thread of data processing by the processing circuitry. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

At least some examples provide an apparatus comprising: processing circuitry to process threads of data processing; and transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, the transactional memory support circuitry comprising conflict detection circuitry to trigger an abort of the transaction in response to detecting a conflicting access from another thread to one of a working set of addresses tracked for the transaction; in which: in response to a transactional compare-and-discard instruction executed within a given transaction, the transactional compare-and-discard instruction specifying a target address and a compare value, the processing circuitry is configured to: load a target data value from a memory location corresponding to the target address; set at least one condition status indication depending on a result of comparing the target data value and the compare value; and discard the target data value without adding the target address to the working set of addresses for the given transaction.

At least some examples provide a data processing method comprising: executing a transaction comprising instructions of a thread executed speculatively between a transaction start instruction and a transaction end instruction, for which the processing circuitry is configured to prevent commitment of results of the speculatively executed instructions until the transaction end instruction is reached, detecting conflicting accesses from another thread to one of a working set of addresses tracked for the transaction, and when a conflicting access is detected, aborting the transaction; and in response to a transactional compare-and-discard instruction specifying a target address and a compare value, which is executed within the transaction: loading a target data value from a memory location corresponding to the target address; setting at least one condition status indication depending on a result of comparing the target data value and the compare value; and discarding the target data value without adding the target address to the working set of addresses for the given transaction.

At least some examples provide a computer program for controlling a host data processing apparatus to provide an instruction execution environment for execution of threads of data processing; the computer program comprising: processing program logic to process threads of data processing; and transactional memory program logic to support execution of a transaction within a thread processed by the processing program logic, the transaction comprising instructions of the thread executed speculatively between a transaction start instruction and a transaction end instruction, for which the processing program logic is configured to prevent commitment of results of the speculatively executed instructions until the transaction end instruction is reached, the transaction memory program logic comprising conflict detection program logic to trigger an abort of the transaction in response to detecting a conflicting access from another thread to one of a working set of addresses tracked for the transaction; in which: in response to a transactional compare-and-discard instruction executed within a given transaction, the transactional compare-and-discard instruction specifying a target address and a compare value, the processing program logic is configured to: load a target data value from a memory location corresponding to the target address; set at least one condition status indication depending on a result of comparing the target data value and the compare value; and discard the target data value without adding the target address to the working set of addresses for the given transaction.

A storage medium may store the computer program. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus having transactional memory support circuitry;

FIG. 3 shows an example of a status register storing condition status indications and a table showing different conditions that can be indicated by the condition status indications;

Figure 6:
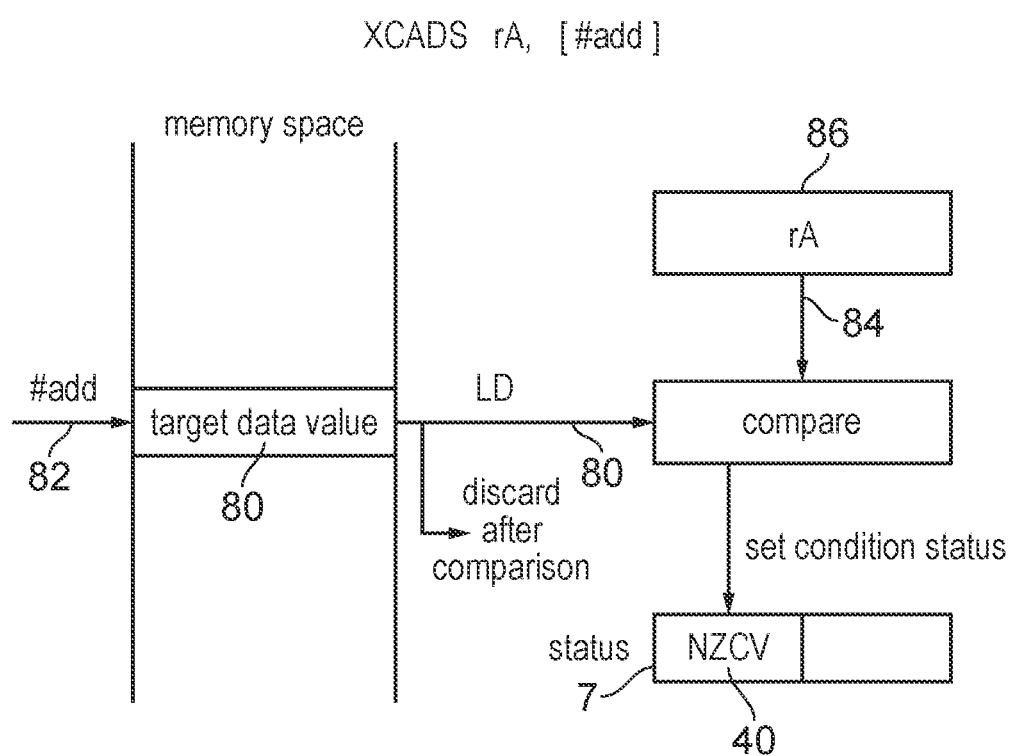
Figure 7:
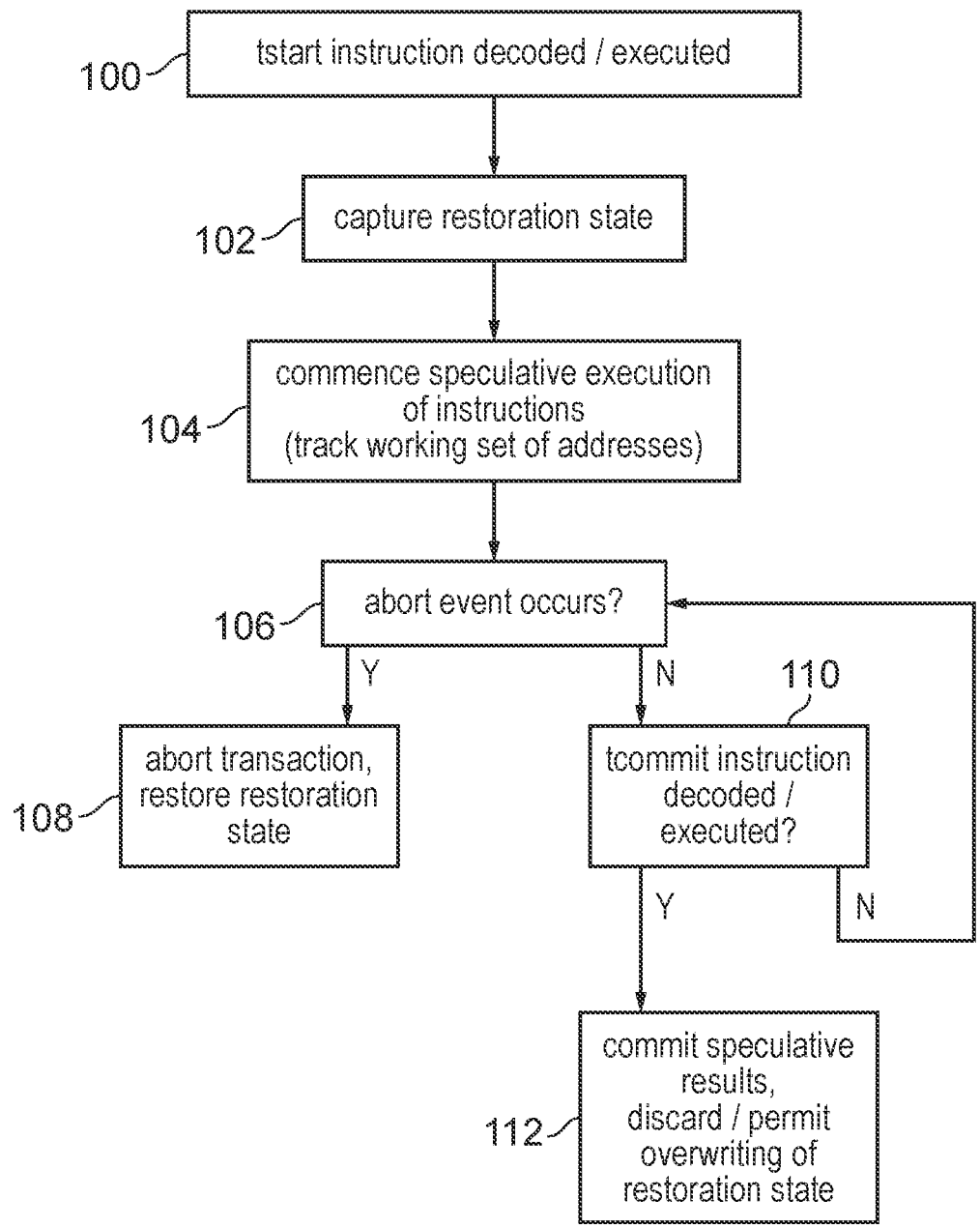
Figure 8:
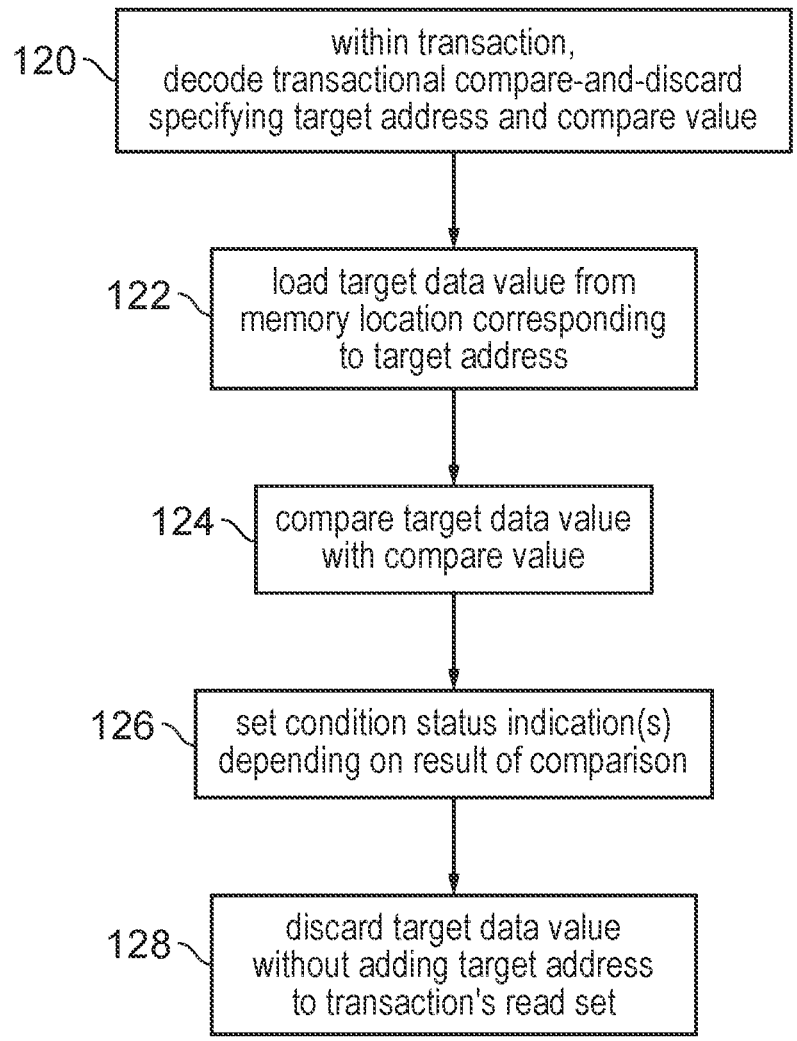
Figure 9:
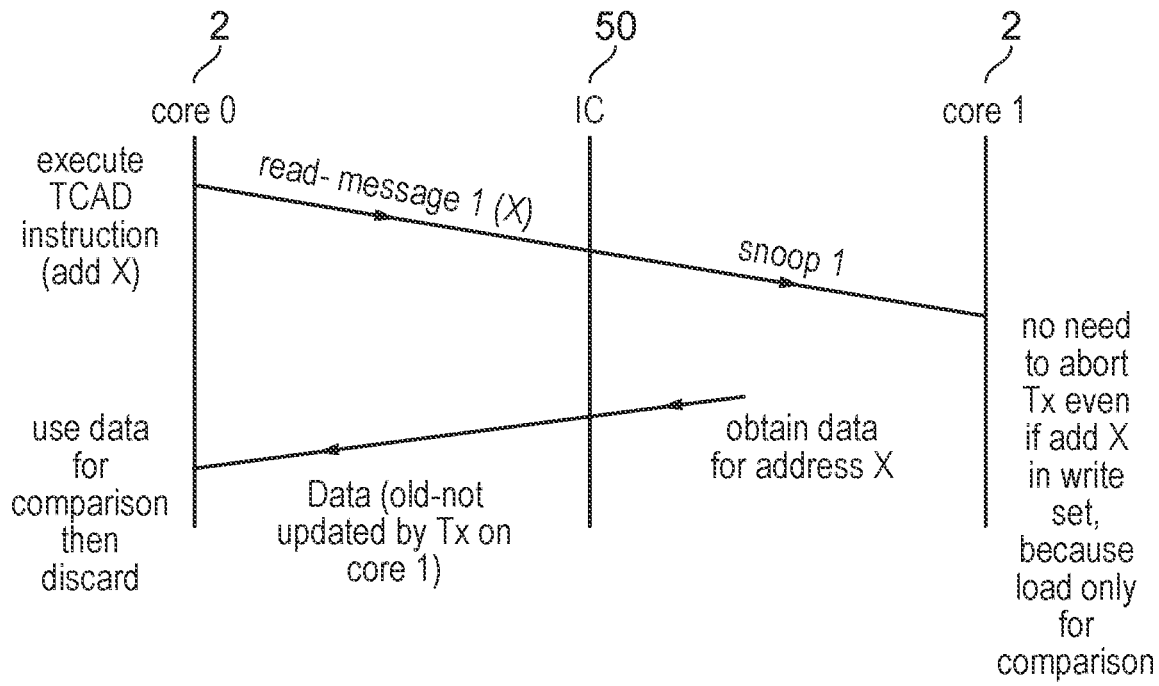
Figure 10:
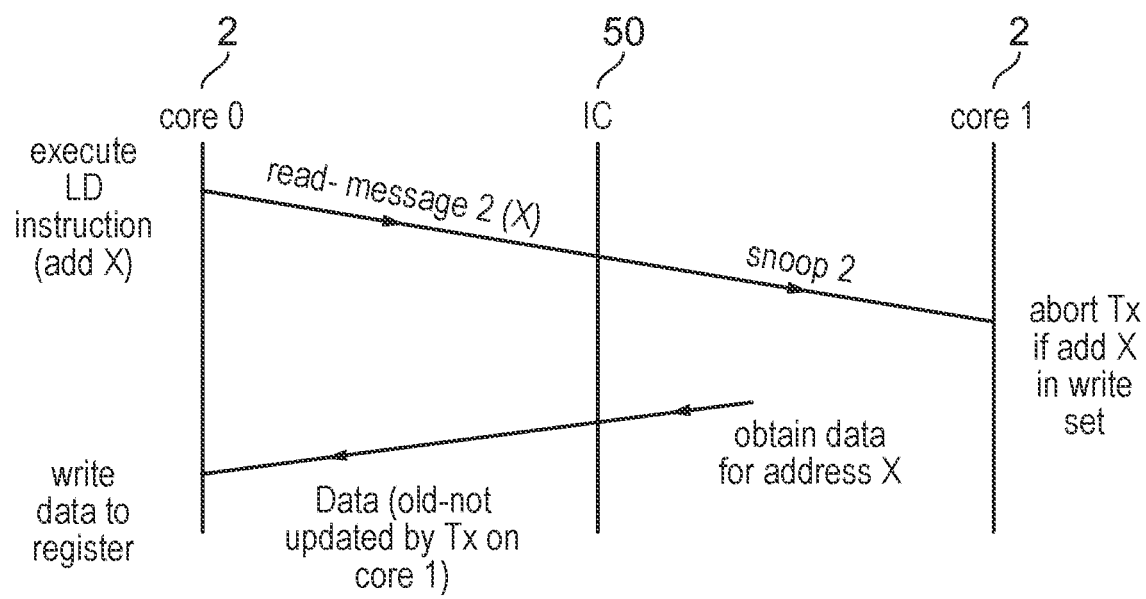
Figure 11:
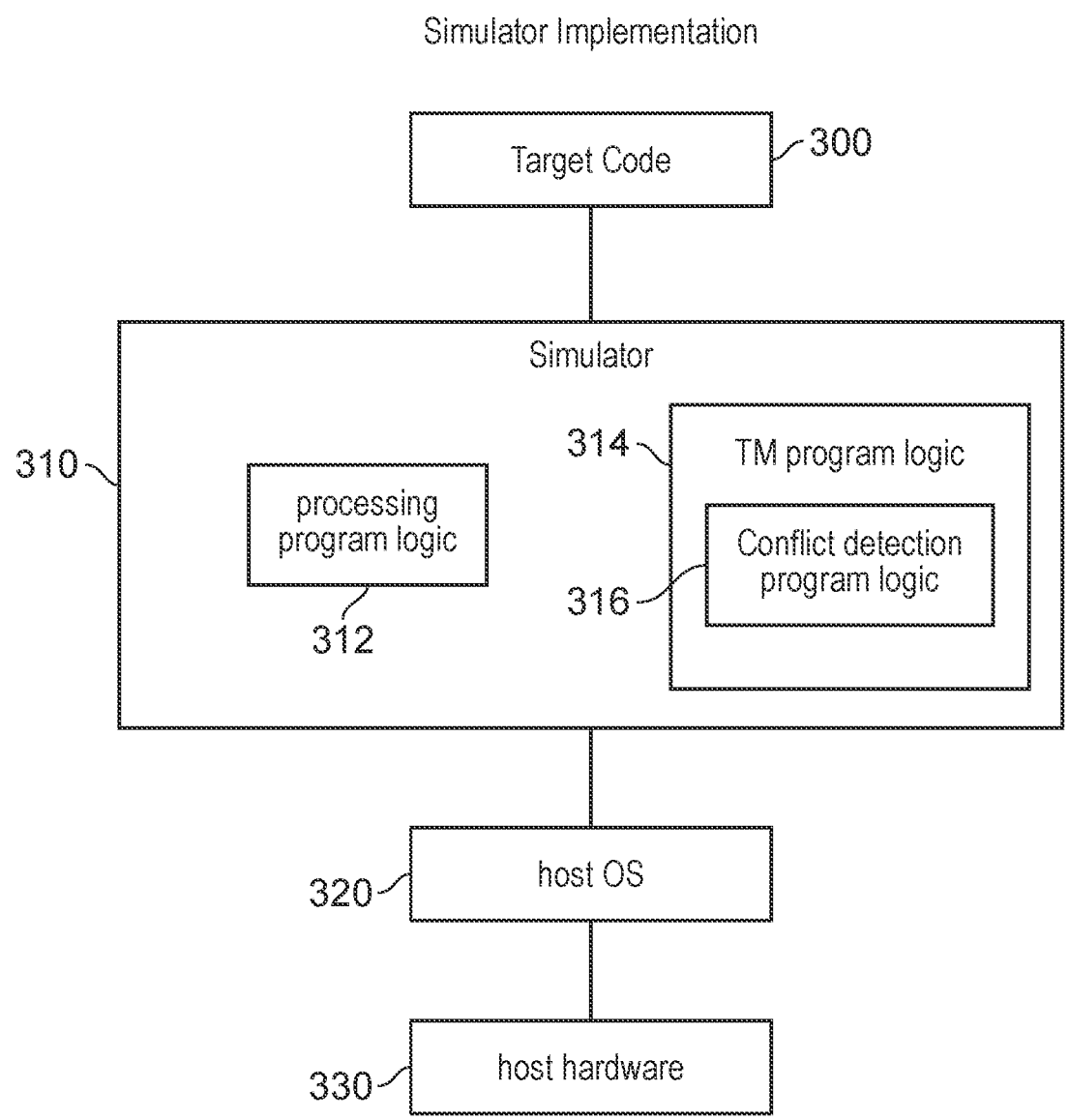

FIG. 6 schematically illustrates an example of a transactional compare-and-discard instruction;

FIG. 7 is a flow diagram showing a method of processing transactions using transactional memory support circuitry;

FIG. 8 is a flow diagram showing a method of processing a transactional compare-and-discard instruction executed within a transaction;

FIGS. 9 and 10 show examples of bus protocol messages used to request loading of data from a memory system; and FIG. 11 shows a simulator example that may be used.

A data processing apparatus may have processing circuitry which has transactional memory support circuitry to support execution of a transaction within a thread of data processing processed by the processing circuitry. The transaction comprises instructions of the thread which are executed speculatively between a transaction start instruction and a transaction end instruction, for which the processing circuitry may prevent commitment of results of the speculatively executed instructions of the transaction until the transaction end instruction is reached, and may abort processing of the transaction when an abort event occurs before reaching the transaction end instruction. The transactional memory support circuitry may comprise conflict detection circuitry to trigger an abort of the transaction in response to detecting a conflicting access from another thread to one of a working set of addresses tracked for the transaction.

In the techniques discussed below the processing circuitry supports a transactional compare-and-discard instruction which specifies a target address and a compare value. In response to the transactional compare-and-discard instruction being executed within a given transaction, the processing circuitry may load a target data value from a memory location (e.g. a cache location or system memory location) corresponding to the target address, set at least one condition status indication depending on a result of comparing the target data value and the compare value, and discard the target data value without adding the target address to the working set of addresses tracked for the given transaction.

This approach is counterintuitive since normally one would expect that any load of data from memory within a transaction should have the corresponding address tracked within the transaction's working set, so that if other threads write to the same address while the transaction is in flight then the transaction can be aborted to avoid the transaction using a potentially stale (out-of-date) value from the required address.

However, the inventors recognised that a transactional compare-and-discard instruction which executes a comparison between a value read from memory and a compare value without adding the target address to the working set of addresses for the transaction can be particularly useful for supporting use of transactional memory in exploiting thread level speculation. Some program loops may include a number of iterations in which each iteration accesses certain memory addresses but it is not known statically at compile time whether there will be aliasing between the addresses accessed by one iteration and the addresses accessed by another iteration. A conservative approach to executing such loops may be to assume that there could be a dependency between loops, and hence to execute each iteration sequentially with a given iteration only being executed once the preceding iteration is complete. In thread level speculation, it is assumed that such aliasing between different iterations may be sufficiently rare that performance can be improved by speculatively executing multiple iterations of the loop in parallel using separate threads of data processing. With thread level speculation, the threads corresponding to multiple iterations can each be executed simultaneously, and a runtime check of whether the addresses accessed by one iteration conflict with addresses accessed by another iteration may be performed and some threads can be cancelled and reexecuted later if there is an address conflict between threads processed in parallel. Transactional memory could be used to support such thread level speculation, since the address tracking and abort mechanism of transactional memory could be used to check for address hazards between the threads corresponding to different iterations of the program loop.

However, to use transactions to support thread level speculation, there may be a need to ensure that the transactions corresponding to each iteration of the loop are committed in an order corresponding to the order of the loop iterations of the original program loop. Typical transactional memory architectures have no way of enforcing a certain order in which transactions are committed relative to other transactions. Instead most transactional memory architectures assume that each transaction is entirely independent.

The transactional compare-and-discard instruction discussed above can support the use of thread level speculation in a transactional memory system. The transactional compare-and-discard instruction may be used to check a variable stored in memory which tracks the most recently committed iteration of the loop being parallelised using thread level speculation. As the transactional compare-and-discard instruction sets the condition status indication based on the result of the comparison, this enables other instructions of the transaction to check whether the transactions for any earlier iterations of the loop have committed.

As the target data value is discarded without adding the target address to the working set of addresses, this means that even when the shared variable indicating the most recently committed iteration of the loop is read/written by multiple threads, such apparent address conflict would not trigger an abort of any of the transactions. This is useful because if transactions were aborted when they access a shared variable defining which iterations have committed, then this would effectively result in all of the transactions being serialised so that they are executed sequentially, hence eliminating the very advantage of using the transactions to support thread level speculation in the first place. The transactional compare-and-discard instruction avoids this problem because the target address accessed in the load is not added to the working set of addresses and so transactions can continue to be executed speculatively without an abort even when one transaction writes to the same shared variable as read by another transaction. The architectural support for the transactional compare-and-discard instruction enables transactions to be used to support transactional memory in a way which is less hardware-intensive than alternative ways of enabling this functionality.

It will be appreciated that thread level speculation is just one functionality which could benefit from the use of a transactional compare-and-discard instruction, and in practice once architectural support for this instruction is provided then programmers or compilers may find other functions which could usefully be performed for this type of instruction. Hence, while the transactional compare-and-discard instruction provides particular architectural benefits to supporting thread levels speculation, the instruction could also be used for other purposes.

The compare value could be specified in different ways by the transactional compare-and-discard instruction. In some cases the compare value could be specified as an immediate value in the instruction encoding of the transactional compare-and-discard instruction.

However, it can be particularly useful to provide an architecture where the transactional compare-and-discard instruction identifies a compare value using a source register. In practice, when this type of instruction is used for supporting thread level speculation, different threads corresponding to different loop iterations may need to compare the value loaded from memory against different values of the compare value depending on the particular iteration which that thread represents. By using a source register to define the compare value, this makes it simpler to write a common set of instructions to be executed for different iterations in respective transactions.

In response to the transactional compare-and-discard instruction, the processing circuitry may discard the targeted value without writing the target data value to an architectural register of the processing circuitry. Hence, the target data value read from memory is not made accessible to the software as a result of executing the transactional compare-and-discard instruction. Instead, the transactional compare-and-discard instruction only provides a limited access to the target data value for the purpose of comparing it with the compare value and setting at least one condition status indication depending on the result of the comparison.

By limiting the extent to which the software gains access to the target data value within the architectural registers, this makes it less likely that the compare-and-discard instruction could be used inappropriately by a programmer or a compiler to attempt within a transaction access to a data value which could potentially be accessed by other threads. In contrast, if a general non-transactional load instruction was provided, which could be executed within a transaction to write a target value loaded from memory into an architectural register (without tracking the corresponding address in the working set of addresses for the given transaction), this would be more open to misuse by a programmer or compiler as it may be that addresses which should really be tracked for conflicts with other threads are inappropriately accessed by the non-transactional load.

In some architectures, the transactional compare-and-discard instruction may be restricted to only execute successfully when a transaction is in-flight. Hence, if a transactional compare-and-discard instruction is attempted to be executed when not within a transaction, an instruction decoder could treat the transactional compare-and-discard instruction as an undefined instruction and trigger an exception to cause the undefined instruction to be handled by an exception handler.

Alternatively, the transactional compare-and-discard instruction could also be supported when not executing instructions within a transaction. In this case the transactional compare-and-discard may trigger the processing circuitry to load a data value from memory and compare the loaded data value with a compare value specified by the instruction.

The architecture supporting the transactional compare-and-discard instruction may also support at least one form of conditional instruction which specifies a test condition. The conditional instruction controls the processing circuitry to perform a processing operation conditional on the at least one condition status indication meeting the test condition. For example, the architecture may require a dedicated condition status register to be provided for storing one or more condition flags representing the condition status indication. For example, the condition flags may represent properties of previous processing results, such as whether a result was negative, involved an overflow, involved a carry, or was 0. The at least one condition status indication may be the same indication that is also set by other forms of condition setting instruction, other than the transactional compare-and-discard instruction.

The transactional memory support circuitry may, in addition to the conflict detection circuitry, also include other elements. For example the transactional memory support circuitry could include speculative result storage circuitry to store results of speculatively executed instructions for at least one transaction, and/or restoration state storage circuitry to store architectural state captured in response to the transaction start instruction of a transaction, which can be restored if the transaction is aborted. For example, the speculative result storage circuitry could buffer results of store instructions until the transaction is committed in response to the transaction end instruction, so that the speculatively executed store instructions within the transaction do not pollute the memory system until it is known that the transaction can be committed. The restoration state storage circuitry could for example include registers within a register bank for retaining a checkpoint of state present at the start of the transaction in case the state needs to be rewound to that earlier point of execution when the transaction is aborted. Alternatively, the restoration state could be maintained using register renaming to track old checkpointed architectural state within the same register file as the registers storing the current architectural state.

Another possible reason for aborting the transaction may be if the transactional memory support circuitry runs out of resources so that it is no longer possible to guarantee that the transaction will proceed correctly without conflict. For example, if the number of speculative results to be stored in the speculative result storage circuitry exceeds the capacity available within the storage provided, then a transaction could be aborted.

On aborting a transaction, it may be up to software to determine whether to try to execute the transaction again, or to use a non-transactional fallback path instead (e.g. using locks and load/store-exclusive instructions). However, the micro-architecture of the processing circuitry could provide hints to indicate a possible reason of the abort of the transaction, which could be used by the software to determine whether it is worth attempting to execute the transaction again or to use the fallback path (e.g. if the cause of the abort is such that any future attempt would be likely to fail).

As discussed above, the transactional compare-and-discard instruction may be used to perform thread level speculation in which two or more threads of processing are executed, with each thread corresponding to a respective iteration of a program loop and each thread comprising at least one transaction. In such a use case, the transactional compare-and-discard instruction may specify as the target address an address of a loop iteration commit variable for tracking process in committing transactions for the plurality of iterations of the program loop. Each thread may include, within a transaction, one or more instructions for determining whether to abort the transaction based on whether the at least one condition status indication set by the transactional compare-and-discard instruction satisfies a test condition. For example each thread may include, within a transaction, a while loop which uses the transactional compare-and-discard instruction to compare the loop iteration commit variable against a compare value specific to the current loop iteration, tests the resulting condition status indication(s) using a conditional instruction, and then conditionally branches back to the start of the loop if the condition status indication does not yet indicate that the current loop iteration is ready to commit. When the current loop iteration is ready to commit, program execution may proceed to a transaction end instruction to commit the results of the entire transaction.

The processing circuitry may interact with the memory system using bus protocol messages defined according to a particular bus protocol. In response to the transactional compare-and-discard instruction, the processing circuitry may trigger issue of a first bus protocol message for requesting the load of the target data value from a memory system. The first bus protocol message may comprise an indication which distinguishes the bus protocol message from a second bus protocol message issued for other types of instruction requiring a load of a data value from memory. For example, the first bus protocol message could be of a different message type to the second bus protocol message, or could be of the same message type as the second bus protocol message but may specify a parameter or control flag which distinguishes the first bus protocol message from the second bus protocol message. It can be useful for the bus protocol messages to distinguish loads triggered by a transactional compare-and-discard instruction from loads triggered by other types of instructions, because for the transactional compare-and-discard instruction some operations (which may otherwise be required for general load operations to ensure data coherency and/or manage conflicts between transactions executing on different processing elements) may not be needed for a load triggered by a transactional compare-and-discard instruction, which can enable some performance improvements.

For example, in a system comprising a further processing element also comprising the transactional memory support circuitry, in response to receipt of the first bus protocol message or a further bus protocol message triggered by the first bus protocol message (e.g. a snoop message triggered by an interconnect in response to the first bus protocol message), then if the further processing element is currently executing a transaction for which the target address is part of a write set of addresses tracked for that transaction, it is not necessary to abort the transaction on the further processing element. Instead, the transaction at the further processing element can be permitted to continue unaborted, until it reaches its transaction end instruction (unless any other cause for an abort is detected). This would be counter-intuitive since normally one would expect that for mutual exclusion it is necessary to abort a transaction with an address in its write set when another transaction reads the same address, to ensure that a write to an address by one transaction cannot commit after the same address has been read by another transaction.

However, in the expected use case for the transactional compare-and-discard instruction, the instruction may be used within a while loop which spins until a shared iteration tracking variable has reached the required value, so it is not a problem if the load associated with the transactional compare-and-discard instruction is serviced using an out of date value which has already been written to by another transaction executing on a different processing element. Even if the value loaded by the transactional compare-and-discard instruction is out of date, in this case the while loop would simply spin for some additional cycles until the other transaction is committed and the updated value can then be returned on a subsequent pass through the while loop. As aborting the transaction at the further processing element would in any case simply result in the old value (not updated by the aborted transaction) being returned, the effect at the first processing element executing the transactional compare-and-discard instruction is the same, but by not aborting the transaction at the further processing element performance can be improved since it is not necessary to restart the transaction again later.

Also, as it is not always necessary to provide the most up to date value when servicing the load associated with the transactional compare-and-discard instruction, this means the memory system (or interconnect) may be able to service the load faster by providing a (potentially out of date) value from a cache with lower access latency than if a value which is guaranteed to be the most up to date value had to be obtained, which might require longer access latency in some cases.

Hence, providing a bus protocol with a message format which distinguishes loads triggered by a transactional compare-and-discard instruction from other types of load can be useful to enable performance improvements.

A corresponding computer program may be provided for controlling a host data processing apparatus to provide an instruction execution environment for execution of threads of data processing, the computer program comprising processing program logic to process threads of data processing and transactional memory program logic to support execution of a transaction within a thread processed by the processing program logic (in a similar way to the support for transactions discussed above for a hardware embodiment). The transactional memory program logic may comprise conflict detection program logic for triggering a transaction to be aborted when a conflicting access from another thread to one of the working set of addresses tracked for the transaction is detected. The program logic of the computer program may respond to the execution of a transactional compare-and-discard instruction in a similar way to the corresponding processing circuitry as discussed above.

Hence, a computer program may be provided which presents, to software executing above the computer program, a similar instruction environment to that which would be provided by an actual hardware apparatus having the features discussed above, even though there may not be any actual hardware providing these features in the host computer executing the computer program. Instead the computer program, which may for example be a simulator or a virtual machine, may emulate the functionality of the hardware architecture by providing program logic (such as sets of instructions or data structures) which enables a generic host data processing apparatus to execute code intended for execution on an apparatus with transactional memory support, in a manner compatible with the results that would be achieved on the apparatus with transactional memory support.

The computer program may be stored on a storage medium. The storage medium may be a non-transitory storage medium.

Figure 1:
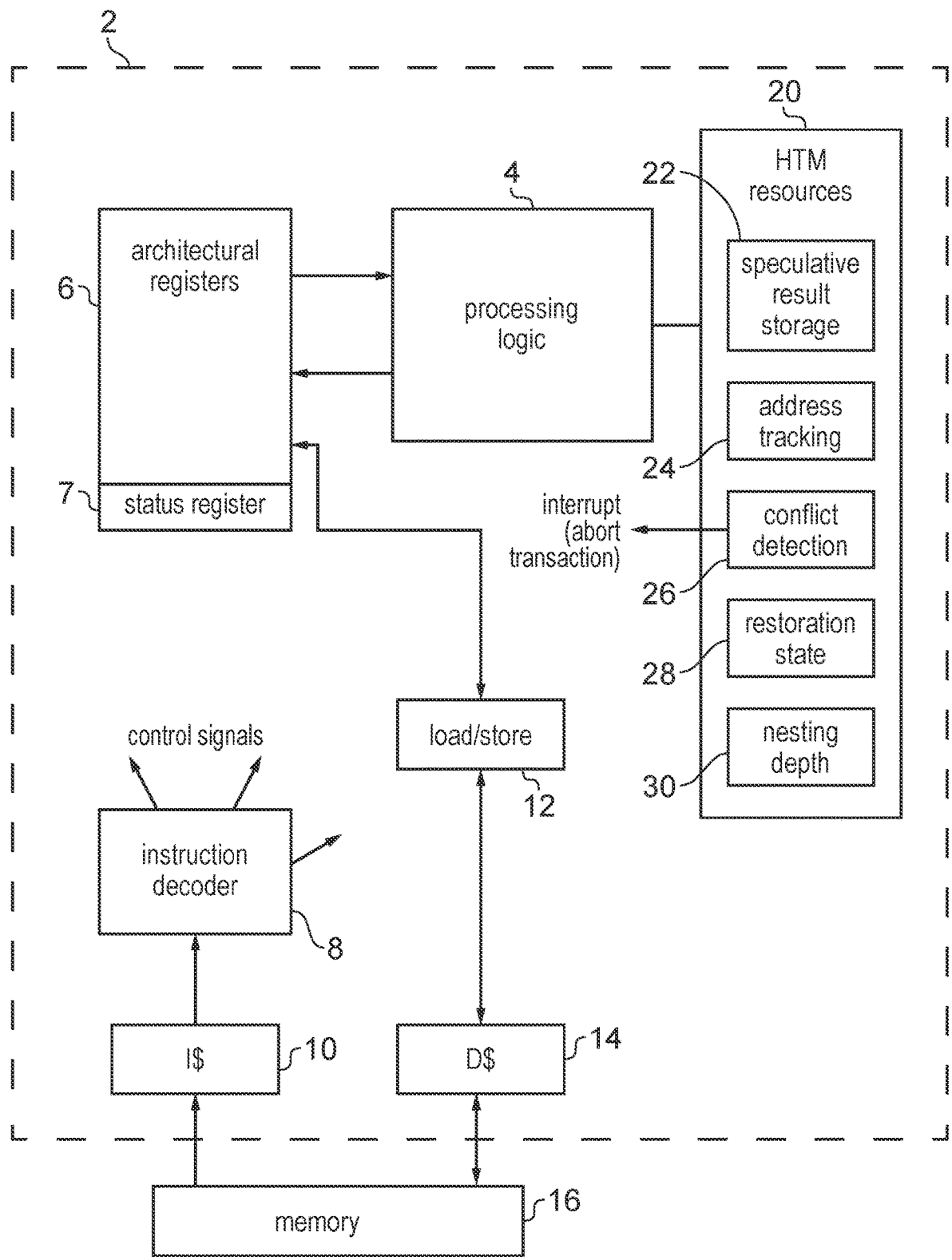

FIG. 1 illustrates an example of a data processing apparatus comprising a processor core 2 with hardware transactional memory (HTM) support. The core 2 has processing logic 4 for executing instructions to carry out data processing operations. For example the processing logic 4 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing logic 4 and for storing the results of the executed instructions. The architectural registers 6 include a status register 7 for storing at least one status value (e.g. a condition flag) indicating a property of a result of a previously executed instruction. An instruction decoder 8 decodes instructions fetched from an instruction cache 10 to generate control signals for controlling the processing logic 4 or other elements of the data processing apparatus 2 to perform the relevant operations. A load/store unit 12 is also provided to perform load operations (in response to load instructions decoded by the instruction decoder 8) to load a data value from a data cache 14 or main memory 16 into the architectural registers 6, and store operations (in response to store instructions decoded by the instruction decoder 8) to store a data value from the architectural registers 6 to the data cache 14 or memory 16.

The processor core 2 also has transactional memory support circuitry 20 which provides various resources for supporting hardware transactional memory (HTM). The HTM resources in the transactional memory support circuitry 20 may include for example speculative result storage 22 for storing speculative results of transactions, address tracking circuitry 24 for tracking a working set of addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted. In some examples, the tracking of the working set of addresses may include separate tracking of a read set of addresses (representing addresses read by the transaction), and a write set of addresses (representing addresses written to by the transaction). For example, the read/write sets of addresses could be tracked by setting flags in a cache indicating whether associated cache lines are part of the read set or write set respectively for a given transaction.

Also the resources may include a nesting depth register 30 for storing a nesting depth value tracking a level of nesting of transactions. It can be useful for a programmer or compiler to be able to define nested transactions (where a second transaction start instruction is encountered after a first transaction start instruction, but before the transaction end instruction corresponding to the first transaction start instruction). This can be useful to ensure that a critical section of code is treated atomically even if there is a branch into a part of the code beyond the first transaction start instruction. However, to avoid having to capture multiple checkpoints of architectural state in the speculative result storage, some microarchitectures may effectively ignore the "inner" transactions of a nested set of transactions, and only capture a checkpoint of an architectural state in response to the very first transaction start instruction. Any subsequent transaction start instruction arising before the transaction end instruction may effectively be ignored, except that the nesting depth register 30 may be incremented to track how many transaction start instructions have been encountered, so that on encountering the transaction end instructions, the micro-architecture can track which transaction end instruction relates to the outer transaction of the nested set of transactions. Hence, when encountering a transaction end instruction, if the nesting depth is one or more, then the transaction end instruction is ignored, and if the nesting depth is zero (indicating that the transaction is the outer transaction of a nested set), the transaction may be committed.

Figure 2:
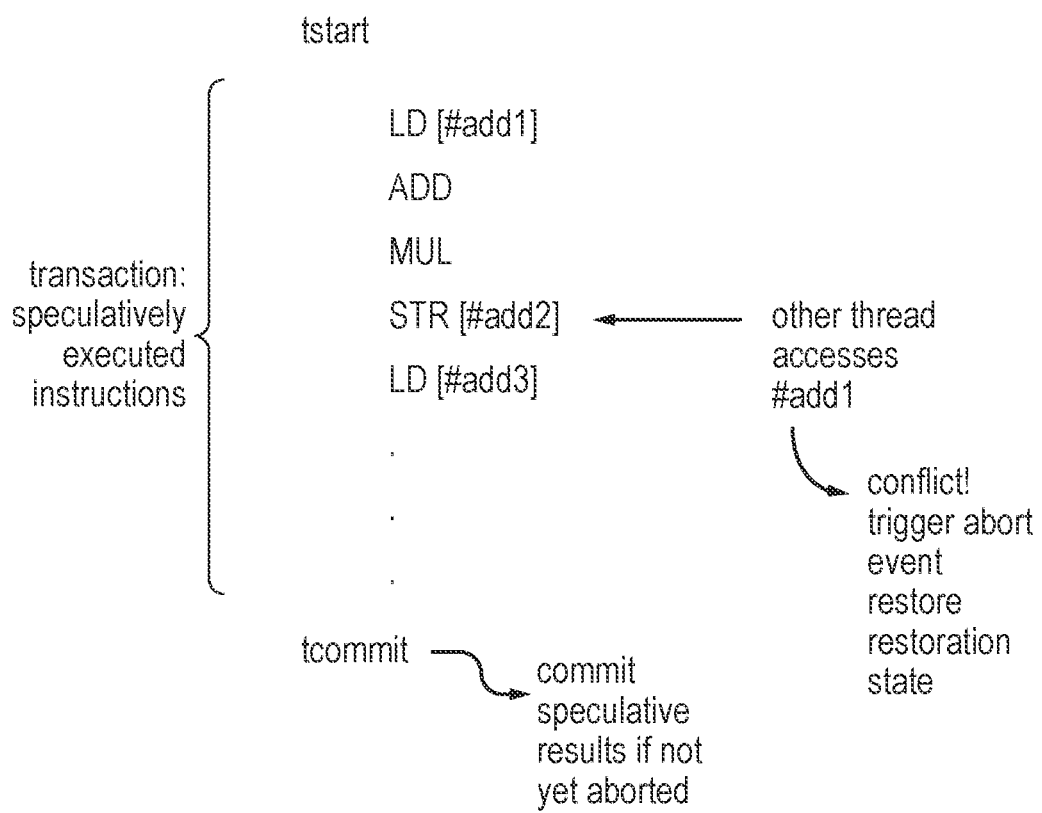
FIG. 2 shows an example of processing a transaction using transactional memory resources.

FIG. 2 shows an example of executing a transaction within a given thread using the transactional memory support circuitry 20 and the processing logic 4. A transaction is a section of program code which is bounded by a transaction start instruction (tstart) and a transaction end instruction (tcommit). As shown in FIG. 2, in response to the transaction start instruction the current architectural state in the architectural registers 6 is captured and stored in the restoration state storage circuitry 28. The processing logic 4 begins to perform speculative execution of the subsequent instructions following the tstart instruction, and as these instructions are executed, the addresses accessed by those instructions are tracked by the address tracking circuitry 24, and the conflict detection circuitry 26 detects conflicts between the tracked addresses and addresses of memory accesses made for other threads. At least some speculative results of the instructions within the transaction are stored within the speculative result storage circuitry 22. For example the value stored to the cache or to memory in response to a store instruction STR may be held in the speculative result storage 22 while the transaction remains pending. If the transaction end instruction (tcommit) is reached without an abort event occurring in the meantime, then in response to the transaction end instruction the speculative results are committed. On committing the transaction, any results stored in the speculative result storage 22 for that thread may be written to the data cache 14 or memory 16 and the restoration state 28 can be discarded or permitted to be overwritten as it is no longer needed to rewind architectural state to the point before the transaction start instruction was encountered.

On the other hand, if an abort event occurs, for example when a conflict is detected by the conflict detection circuitry 26 when another thread accesses an address already accessed by the transaction, then an abort of the transaction is triggered and the restoration state from the restoration state storage 28 is restored to the architectural registers 6. Other causes of an abort event could for example include execution of an instruction which is not allowed to be executed within a transaction, insufficient resource within the speculative result storage 22 or an address tracking circuitry 24 for handling the speculative results or addresses required by a given transaction, or an interrupt being received during the transaction.

FIG. 3 schematically illustrates an example of condition status indications 40 indicated in the status register 7. The instruction set architecture supported by the instruction decoder 8 may include a number of types of condition setting instruction, which could be an arithmetic or logical instruction for performing an arithmetic/logical operation and setting the condition status 40 based on a property of the result, or a dedicated comparison instruction for comparing two values and setting the condition status indications 40 based on the result of the comparison. The comparison instruction may effectively be a subtraction instruction which subtracts one of the values to be compared from the other, and sets the condition flags 40 based on the subtraction result. In this example, there are four condition status indications 40: a negative flag N indicating whether a previous processing result was negative; a zero flag Z indicating whether a result of a previous processing operation was zero; a carry flag C indicating whether a previous processing operation involved a carry out from the most significant bit of the result; and an overflow flag V which is set if a processing operation produces a signed result with an overflow from the second most significant bit to the most significant bit (where the most significant bit represents the sign bit indicating the sign of the result).

As shown in the table in the lower part of FIG. 3, a number of condition codes may be assigned corresponding to various sets of values for the condition status indications. The meaning of each condition code is indicated in the table together with the corresponding flag values of the condition status indications 40. A conditional instruction may specify a parameter indicating a particular test condition (e.g. EQ, NE, etc.) to be satisfied in order for a corresponding conditional operation to be carried out. The test condition parameter of the conditional instruction may define one of the condition codes specified in FIG. 3.

Figure 4:
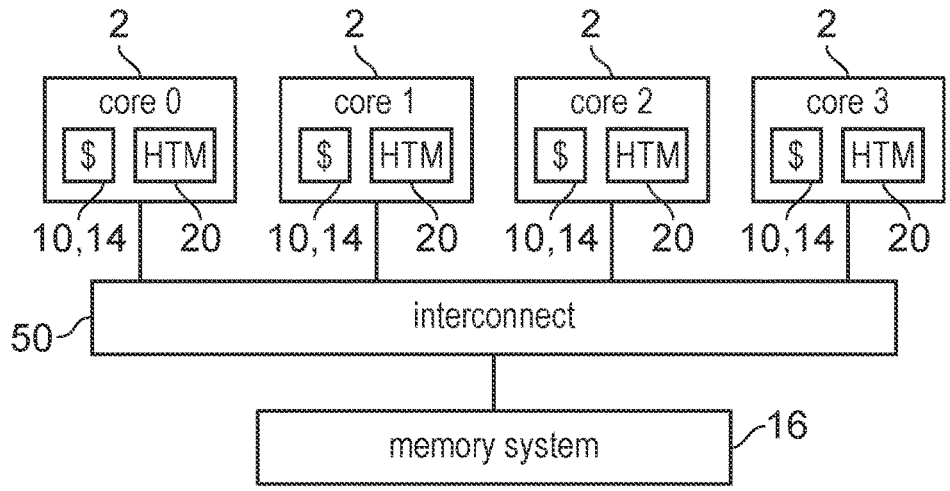
FIG. 4 shows an example of a multi-core processing system.

As shown in FIG. 4, the processor core 2 shown in FIG. 1 may be one of multiple cores 2 in a multi-processor system. The processor cores 2 may be connected via an interconnect 50 which may handle communication between the cores and access to the memory system 16. In some cases the interconnect 50 may be a coherent interconnect which also manages coherency between respective caches 10, 14 of the different cores 2.

In some examples at least two of the cores 2 may include the hardware transactional memory resources 20 shown in FIG. 1. In some cases all of the cores 2 may have such hardware transactional memory resources 20. However this is not essential and in some cases there may also be some processor cores which are not capable of executing transactions. In the example of FIG. 4, each of the individual cores 2 is shown as having the transactional memory support circuitry 20 within the micro-architecture of the individual processor core 2, but this is not essential. In some cases some transactional memory resources can be shared between processor cores. For example some common storage for capturing restoration state or tracking addresses could be provided, which can be shared for use between multiple processor cores.

Figure 5:
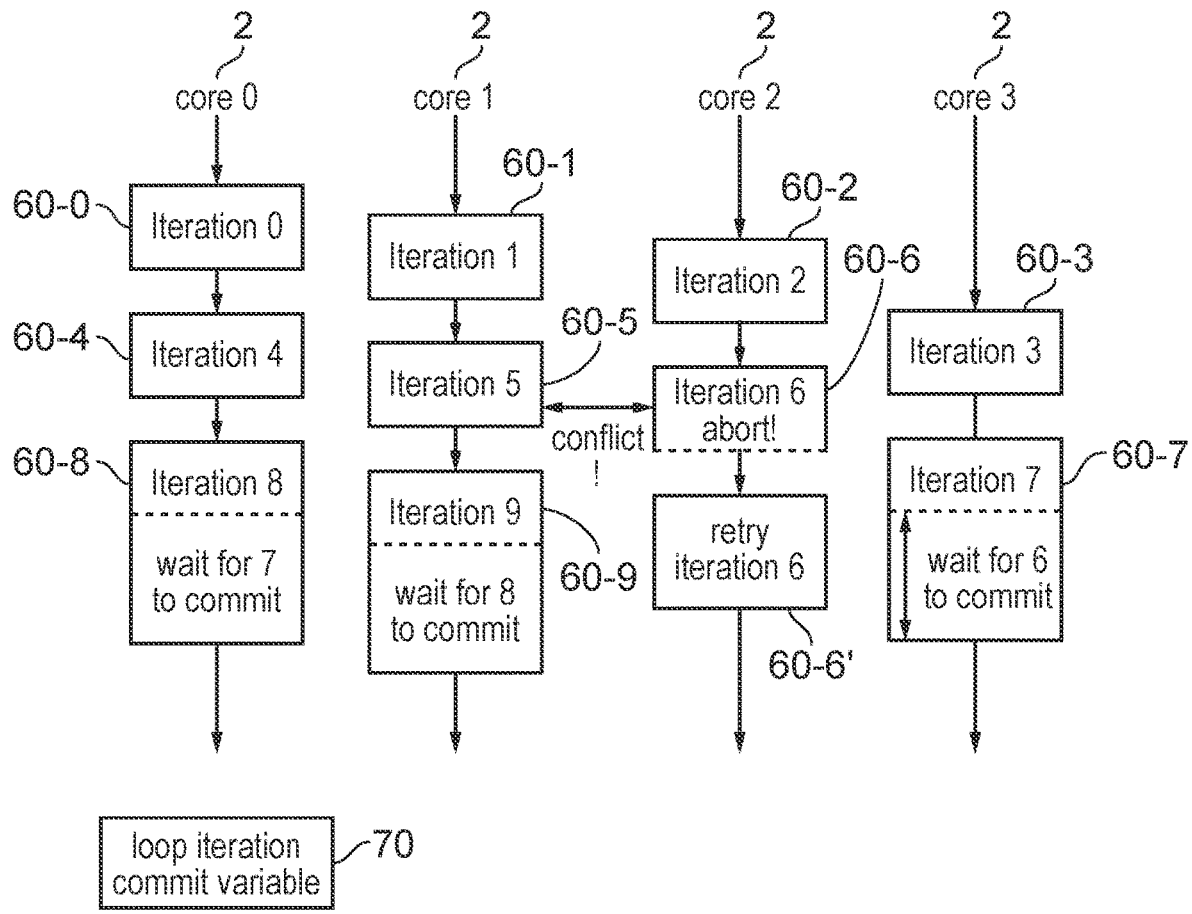
FIG. 5 shows an example of performing thread level speculation on a multi-core system supporting transactional memory.

FIG. 5 schematically illustrates the use of transactions executing on multiple processor cores 2 for carrying out thread level speculation (TLS). TLS is a technique for speeding up execution of a program loop which is expected to be free of dependencies between iterations at runtime, but where the iterations cannot be proven to be independent at compile time. For example, such program loops may include address access patterns that depend on the data which is input to the program, or make indirect accesses to memory that cannot be disambiguated by the static analysis available to the compiler. Hence, while often such loops may be able to execute with multiple iterations performed in parallel, sometimes conflicts could arise between the addresses accessed by different iterations and if so then this may need to be detected to prevent a later iteration using the incorrect value when it is updated by an earlier iteration in the loop after it has already been read by the later iteration.

The transactional memory resources 20 discussed above can be useful for carrying out address conflict checking. Hence, as shown in FIG. 5, for a given loop, each iteration may be allocated to a particular thread of processing performed on one of the processor cores 2, where the operations of the iteration are performed within a transaction 60 performed in the corresponding thread of processing. For example in FIG. 5 the operations corresponding to iteration 0 of the loop have been allocated to a transaction 60-0 performed in a thread on core 0, the operations corresponding to iteration 1 have been allocated to a transaction 60-1 performed in a thread on core 1 and so on for the other iterations of the loop. In this example there are four processor cores supporting transactional memory and so four iterations can be processed in parallel.

The transaction corresponding to a given loop iteration cannot be committed until the preceding iteration of the loop has also had its transaction committed, so that if a conflict is detected between the addresses accessed by one iteration and the addresses accessed by another iteration then the later iteration can be aborted and restarted once the earlier iteration having the conflicting address has committed. This ensures that the overall result is the same as if all of the iterations have been executed one by one in a sequential manner. To help track which iterations have been committed, a loop iteration commit variable 70 is stored in the memory system 16 and each of the transactions 60 includes some instructions for checking the current value of the loop iteration commit variable 70 to determine whether the transactions for the required earlier iterations have been committed, and hence whether the current transaction can also commit. For example each transaction may include a while loop which loops until the loop iteration commit variable indicates that the relevant preceding iteration has committed, and then allows the transaction to be committed by executing a transaction end instruction. The particular form in which the loop iteration commit variable 70 is represented can vary. For example the loop iteration commit variable could in some cases indicate the iteration number of the most recently committed iteration. In other alternatives, the loop iteration commit variable 70 may indicate the iteration number of the next iteration to be committed. In general the loop iteration commit variable 70 may take any value which enables the code to deduce which iteration is the next one to commit.

Hence, each of the transactions 60 includes (towards the end of the transaction code) some instructions for checking the loop iteration commit variable to determine whether it is possible to commit the current transaction. In the example of FIG. 5, the transactions 60 corresponding to iterations 0 to 5 execute without any conflict being detected against the addresses accessed by earlier transactions so these are able to commit without delay. That is, the transactions 60-0 to 60-5 for iterations 0 to 5 accessed addresses which were independent from each other.

However, when executing the transaction 60-6 for iteration 6 a conflict is detected between an address accessed in iteration 6 and an address accessed in iteration 5. This triggers the abort of the transaction 60-6 corresponding to iteration 6. The processor core 2 executing the transaction 60-6 then retries a transaction 60-6' corresponding to loop iteration 6 once the transaction 60-5 for loop iteration 5 has already committed.

However, as a consequence of the transaction 60-6 for loop iteration 6 being aborted and retried, this then delays the commit for the transactions corresponding to subsequent iterations 7, 8 and 9, as they must wait for loop iteration 6 to commit before they can commit. Hence, even if the actual processing operations during transaction 60-7, 60-8 and 60-9 are accessing addresses which are independent of the addresses accessed in any other iteration, these transactions are prevented from committing until transaction 60-6' has finished.

Hence in general, to support use of transactions for implementing TLS, a mechanism is needed for allowing different transactions to access a shared variable 70 for tracking the commitment of respected iterations of a program loop. It is desirable that the load from memory for accessing the shared loop iteration commit variable 70 does not trigger the abort of any other transaction which reads/writes to the same address, because otherwise each of the iterations of the program loop would have to be performed sequentially one by one, which would eliminate the very advantage of using TLS in the first place to parallelise different iterations of the same program loop.

One approach for supporting such non-aborted access to a shared variable for multiple transactions could be to provide an instruction set architecture which allows a transaction to be suspended part way through the transaction without aborting the transaction, so that during the time when a transaction is suspended a number of memory access can be made which result in the corresponding addresses being accessed from memory without adding those addresses to the transaction's working set of addresses.

In such an architecture, if during the period of suspension other threads have accessed one of the addresses which were added to the working set of addresses prior to the suspension of the current transaction, then the transaction is aborted on resumption of the transaction following the period of suspension. However the addresses accessed by the suspended transaction itself during the suspension are not added to the working set of addresses. This instruction set architecture functionality could be used to support TLS by suspending a thread just before it needs to check the shared loop iteration commit variable so that the access to that variable will not be treated as an address to be tracked in the working set of addresses. However, a problem with this approach is that providing the microarchitectural support for suspending and resuming transactions mid-transaction is relatively expensive in terms of the additional hardware logic required. This is a heavyweight approach which may be unlikely to be adopted in some architectures.

Another approach for enabling a shared variable to be checked without tracking that address in the working set of addresses for a transaction may be to provide a non-transactional load instruction which enables a general load access to a specified memory address, so that the data value read from the address location is returned to the processor core and placed in the architectural registers 6 of the processor core 2, but without the corresponding memory address being added to the working set of addresses tracked by the address tracking circuitry 24. This approach may be undesirable, because providing the general ability for code to execute a load to an arbitrary address without that address being tracked in the working set of addresses for a transaction may lead to inappropriate use of transactions for operations which are not really intended to be processed in a transactional manner. This could lead to problems as it may result in transactions in practice remaining pending for much longer within program code written by a programmer or a compiler, which may place stress on the transactional resources 20 available. By not supporting non-transactional loads, the programmer/compiler is forced to consider more carefully which operations really need to be bounded by transaction start/end instructions. Also, it is also more likely that a programmer or compiler may inadvertently use a non-transactional load for accessing a variable which really should be accessed transactionally so that its address is added to the working set of addresses so that conflicts can be detected and transactions aborted if necessary. Hence, it may generally undesirable to provide general architectural support for loads to memory within a transaction that do not result in the corresponding address being tracked in the working set of addresses for the transaction.

FIG. 6 shows a transactional compare-and-discard instruction which can address these problems. The instruction decoder 8 recognises a particular type of instruction encoding (instruction of code) as representing the transactional compare-and-discard instruction. In response to detecting such an instruction, the decoder 8 generates control signals for controlling the processing logic 4 to load a target data value 80 from the memory system 14, 16 from a location identified by a target address 82 which is specified by parameters of the transactional compare-and-discard instruction, and to compare the target data value 80 with a compare value 84 which is specified within a source register 86 of the architectural register file 6. The transactional compare-and-discard instruction identifies this source register 86 within the encoding of the instruction. The target address 82 could be an absolute address or a relative address identified relative to the address of the transactional compare-and-discard instruction itself, and could be identified based on an immediate value or values in one or more registers. Based on the result of comparing the target data value 80 with the compare value 84, the processing logic 4 sets the condition status indications 40 of the status register 7 to values depending on the result of the comparison. The processing logic 4 then discards the target data value 80 without writing the target data value 80 to any of the architectural registers 6 of the processor core 2 and without adding the target address 82 to the working set (read set) of addresses tracked by the address tracking circuitry 24. Hence, the code executing the transactional compare-and-discard instruction does not gain access to the actual value of the target data value 80, but merely sees the resulting condition flags 40 which were set based on the comparison with the compare value 84. For example, the condition flags 40 may indicate whether the compare value 84 was greater than or less than or equal to the target data value 80.

Hence, when using transactions to implement TLS as shown in FIG. 5, the transactional compare-and-drop instruction can be used towards the end of each transaction to check the loop iteration commit variable 70 and compare it against a compare value specified in a register which indicates (directly or indirectly) the iteration number of the processing being performed by the current transaction. This allows the transaction to determine whether or not it is ready to commit or should wait until other transactions have committed. Since the compare and discard instruction does not provide general access to the target data value 80 itself, it is less likely that this transaction could be misused by programmers or compilers, and the architectural support for the compare-and-discard instruction means that it is not necessary to support the ability to suspend transactions midway through, which can greatly reduce the microarchitectural overhead of implementing the instruction set architecture.

FIG. 7 illustrates a flow diagram showing a method of processing transactions. At step 100 a transaction start instruction is decoded and executed. In response, at step 102 the restoration state storage 28 captures a current snapshot of the architectural state in the architectural registers 6, as the restoration state to be maintained for the transaction. It will be appreciated that while in some cases this could result in the captured architectural state being written to separate registers, other implementations may use a physical register file for the architectural registers 6 which has a greater number of registers than the number of registers supported in the instruction set architecture, with register renaming being used to remap which particular physical register is considered to store the data value for a particular architectural register required by the architecture. In such a system, register renaming could be used to change the mapping from architectural registers to physical registers on encountering a transaction start instruction, so that previously captured checkpoints of architectural state could effectively be maintained within the same physical register file as the current architectural state itself, which can speed up restoration of state if necessary. In this case, the capture of restoration state could be done by changing the register mappings so may not need any actual transfer of data to/from physical registers.

At step 104, speculative execution of instructions following the transaction start instruction begins. While instructions are executed speculatively within the transaction, results of some speculative instructions may be allocated to the speculative result storage circuitry 22 (e.g. results of store instructions for storing data to memory). Addresses accessed by the speculatively executed instructions may be added to the address tracking structure 24, and while the transaction remains pending accesses by other threads to the working set of addresses maintained by the address tracking structure 24 for the transaction may be monitored.

At step 106 the conflict detection circuitry detects whether an abort event has occurred. For example the abort event could be another thread accessing one of the working set of addresses tracked by the address tracking structure 24, the occurrence of an interrupt or exception, the execution of an instruction type which is not allowed to be executed within a transaction, or the resources available for address tracking 24 or speculative result storage 22 being fully utilised so that it is no longer possible to continue to safely execute the transaction (as some additional addresses or speculative results which may need to be stored may not be able to be tracked anymore). It will be appreciated that other types of abort could also be defined depending on the constraints of the instruction set architecture. If an abort event occurs then at step 108 the transaction is aborted and the restoration state stored in the restoration state storage 28 is restored to the architectural registers 6 which represent the current architectural state of the system. Processing may then resume from the earlier point of executing represented by the restored architectural state. In some cases, on aborting a transaction, the microarchitecture may provide a hint which indicates the reason why the transaction is aborted, which could be used by an exception handler in software to determine whether it is worth attempting to execute the required operations as a transaction again, or whether it is preferable to retreat to executing a fallback path (which does not use transactions) to execute the corresponding processing operations.

If no abort event occurs at step 106, then at step 110 it is determined whether any transaction end instruction has been decoded and executed. If not then the method loops back to step 106 to await either an abort event or the execution of a transaction end instruction. It will be appreciated that the speculative execution of instructions and the tracking of the working set of addresses and potential conflicts continues throughout steps 104 to 110 until either an abort event occurs or a transaction end instruction is reached.

When the transaction end instruction is executed then at step 112 any speculative results of the transaction are committed to state and the previously captured restoration state is discarded or permitted to be overwritten.

FIG. 8 is a flow diagram showing processing of a transactional compare-and-discard instruction as discussed above. At step 120, while executing instructions speculatively within a transaction, the instruction decoder 8 identifies a transactional compare-and-discard instruction which specifies a target address and a compare value. In response, the instruction decoder 8 generates control signals for controlling the processing logic 4 and load/store unit 12 (which may collectively be described as processing circuitry) to perform the subsequent steps of FIG. 8.

At step 122 the load/store unit 12 triggers a load of a target data value from a memory location in the cache 14 or memory system 16 which corresponds to the target address specified by the transactional compare-and-discard instruction. When the target data value is returned from memory, at step 124 the processing logic 4 compares the target data value 80 with a compare value 84 obtained from a register specified by the transactional compare-and-discard instruction. For example the comparison may involve subtracting one of the target data value and the compare value from the other. At step 126 the processing logic sets the condition status flags 40 of the status register 7 depending on a result of the comparison at step 124. For example the Z flag may be set if the target and compare values were equal, the C flag may be set if one of the target data value and the compare value was greater than or equal to the other, and so on. At step 128 the target data value is then discarded without adding the target address 82 to the transaction's read set of addresses tracked by the address tracking circuitry 24, and without writing the target data value 80 to any of the architectural registers 6.

Hence, having executed a transactional compare-and-discard instruction a subsequent conditional instruction such as a conditional branch instruction can then test the values of the condition status indications 40 to determine, depending on the target data value, whether a subsequent transaction end instruction should be executed or whether the program flow should loop back to check again whether the target data value meets the required condition in order to allow the transaction to commit. This is very useful for supporting the thread level speculation as shown in FIG. 5.

FIGS. 9 and 10 show examples of bus protocol messages supported by the bus protocol used by the interconnect 50 to manage data access to the memory system 16 and coherency and conflicts between transactions on multiple processor cores 2. FIG. 9 shows an example of bus protocol messages triggered when a transaction on core 0 executes a transactional compare-and-discard instruction of the type discussed above. The execution of the transactional compare-and-discard instruction at core 0 triggers issue of a first type of read bus protocol message to the interconnect 50. The message species an address X which corresponds to the target address specified by the transactional compare-and-discard instruction. In response to the first type of read bus protocol message, the interconnect 50 sends a first type of snoop message to other cores to check for coherency status of data cached at those cores. Alternatively, if the interconnect 50 maintains tracking data at least partly tracking the data cached at other cores, and can determine based on that tracking data that the data for address X is not cached by any other core, then it may not be necessary to send the snoop message. The interconnect 50 obtains data corresponding to the target address, which could be obtained either from caches at other processor cores 2, or from a system cache within the interconnect, or from the memory system 16. The data is returned to core 0, used for the comparison against the compare value of the transactional compare-and-discard instruction, and then discarded without writing the data to an architectural register or adding the address X into the transaction's read set.

At the time when the transactional compare-and-discard instruction is executed on core 0, there could be another core (e.g. core 1) which is executing a transaction for which address X is specified in the transaction's write set of addresses (i.e. the transaction on core 0 has already requested writing of an updated value to address X—the updated value may be buffered in the speculative result storage 22 of core 1 until the transaction is committed). As the data required by core 0 is only being used for the comparison for the transactional compare-and-discard instruction, e.g. for checking of a loop iteration commit variable 70 expected to be incremented as transactions implementing TLS commit, it is not a problem to return out of date data which has not yet been updated by the transaction on core 1, since this would simply lead to a while loop in the transaction on core 0 spinning for some additional iterations until the transaction on core 1 commits and the up to date value is available. In practice, as the writes to the shared loop iteration commit variable 70 would be expected to be near the end of a transaction, the period for which the write remains speculative at core 1 may be relatively short, so it is unlikely that the while loop at core 0 would need to spin for many additional cycles. Hence, to improve performance at core 1, in response to the snoop message triggered by the first type of read bus protocol message shown in FIG. 9, it is not necessary to abort the transaction on core 1, even though address X specified by the first type of read bus protocol message was in the transaction's write set.

In contrast, as shown in FIG. 10, when core 0 executes another type of load instruction specifying address X, a second type of read bus protocol message is issued to the interconnect 50. The second type of read message may be distinguished from the first type of read message in any way, e.g. by a message type indicator or by a further parameter of the message. In response to the second type of read message, a different type of snoop message is sent to other cores compared to in FIG. 9. When the second type of read bus protocol message is sent, then if another core (e.g. core 1) is currently executing a transaction with address X in its write set, then that transaction is aborted to preserve mutual exclusion and ensure that the transaction on core 1 cannot commit a write to address X after address X has been read by a transaction on core 0.

In summary, the coherence/bus protocol support on the interconnect can use the first type of read message shown in FIG. 9 to denote that the value returned will only be used in a comparison, as opposed to a more general type of load which loads the value into the architectural registers of the core. This means that if core 0 uses a compare and discard instruction in transaction 1, and the address is currently in transaction 2's write set at core 1, and so speculatively modified, the interconnect can choose to respond with an old value (e.g. from a shared cache) rather than aborting transaction 2 and responding with the old data anyway. This can enable performance improvements at both core 0 and core 1—at core 0 the data may be returned faster if it can be returned from a shared cache with lower access latency, and at core 1 the transaction can continue unaborted and may reach commit earlier than if it was aborted and had to be retried later.

FIG. 11 illustrates a simulator implementation that may be used. While the earlier described embodiments implement the present technique in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300, including the predetermined type of load instruction and load/store-exclusive instructions described above, may be executed from within the instruction execution environment using the simulator program 310, so that a host computer 330 which does not actually have the hardware features of the apparatus 2 discussed above can emulate these features. The simulator program 310 may include processing program logic 312, transactional memory program logic 314 and conflict detection program logic 316 providing functionality corresponding to the processing logic 4, hardware transactional memory resources 20 and conflict detection circuitry 26 respectively.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to process threads of data processing; and
transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached,
the transactional memory support circuitry comprising conflict detection circuitry to trigger an abort of the transaction in response to detecting a conflicting access from another thread to one of a working set of addresses tracked for the transaction; in which:
in response to a transactional compare-and-discard instruction executed within a given transaction, the transactional compare-and-discard instruction specifying a target address and a compare value, the processing circuitry is configured to:
load a target data value from a memory location corresponding to the target address;
set at least one condition status indication depending on a result of comparing the target data value and the compare value; and
discard the target data value without adding the target address to the working set of addresses for the given transaction; and
in response to a conditional instruction specifying a test condition, the processing circuitry is configured to perform a processing operation conditional on said at least one condition status indication meeting said test condition.

2. The apparatus according to claim 1, in which in response to the transactional compare-and-discard instruction, the processing circuitry is configured to discard the target data value without writing the target data value to an architectural register of the processing circuitry.

3. The apparatus according to claim 1, in which the transactional memory support circuitry also comprises speculative result storage circuitry to store results of speculatively executed instructions for at least one transaction.

4. The apparatus according to claim 1, in which the transactional memory support circuitry also comprises restoration state storage circuitry to store state captured in response to the transaction start instruction to be restored on aborting the transaction.

5. The apparatus according to claim 1, in which in response to the transactional compare-and-discard instruction, the processing circuitry is configured to trigger issue of a first bus protocol message for requesting the load of the target data value from a memory system;
the first bus protocol message comprising an indication which distinguishes the bus protocol message from a second bus protocol message issued for other types of instruction requiring a load of a data value from memory.

6. The apparatus according to claim 5, comprising a further processing element comprising the transactional memory support circuitry; in which:
in response to receipt of the first bus protocol message or a further bus protocol message triggered by said first bus protocol message, when the target address is within a write set of addresses tracked for a transaction being processed at the further processing element, the further processing element is configured to permit continued unaborted processing of the transaction at the further processing element.

7. The apparatus according to claim 1, in which the conditional instruction comprises a conditional branch instruction and the processing operation comprises a branch operation.

8. An apparatus comprising:
processing circuitry to process threads of data processing; and
transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached,
the transactional memory support circuitry comprising conflict detection circuitry to trigger an abort of the transaction in response to detecting a conflicting access from another thread to one of a working set of addresses tracked for the transaction; in which:

in response to a transactional compare-and-discard instruction executed within a given transaction, the transactional compare-and-discard instruction specifying a target address and a compare value, the processing circuitry is configured to:
   load a target data value from a memory location corresponding to the target address;
   set at least one condition status indication depending on a result of comparing the target data value and the compare value; and
   discard the target data value without adding the target address to the working set of addresses for the given transaction; and
the transactional compare-and-discard instruction specifies a source register storing the compare value.

9. A data processing method comprising:
executing a transaction comprising instructions of a thread executed speculatively between a transaction start instruction and a transaction end instruction, for which the processing circuitry is configured to prevent commitment of results of the speculatively executed instructions until the transaction end instruction is reached,
detecting conflicting accesses from another thread to one of a working set of addresses tracked for the transaction, and when a conflicting access is detected, aborting the transaction; and
in response to a transactional compare-and-discard instruction specifying a target address and a compare value, which is executed within the transaction:
   loading a target data value from a memory location corresponding to the target address;
   setting at least one condition status indication depending on a result of comparing the target data value and the compare value; and
   discarding the target data value without adding the target address to the working set of addresses for the given transaction; and
comprising performing thread level speculation to execute a plurality of threads of processing, each thread corresponding to a respective one of a plurality of iterations of a program loop and comprising at least one transaction.

10. The data processing method according to claim 9, in which the transactional compare-and-discard instruction specifies as the target address an address of a loop iteration commit variable for tracking progress in committing transactions for the plurality of iterations of the program loop.

11. The data processing method of claim 9, comprising executing one or more instructions to determine whether to abort the transaction in dependence on whether the at least one condition status indication satisfies a test condition.

* * * * *